Patented Mar. 1, 1938

2,110,117

UNITED STATES PATENT OFFICE 2,110,117

FROSTING OF GLASS ARTICLES

Karl Duldner and Roman Wadelka, Vienna, Austria, assignors, by mesne assignments, to General Electric Company, Schenectady, N. Y., a corporation of New York No Drawing. Application June 26, 1937, Serial No. 150,654. In Austria January 9, 1937

15 Claims. (Cl. 41—43)

This invention relates to a novel method of manufacturing light-diffusing glass articles, more particularly electric light bulbs, covering and flashing glasses, lamp shades, and the like.

The method according to the invention is characterized by the fact that powdered glass (glass meal) of a nature to be specified in due course is strewn on or otherwise applied to the surface of the glass article (e. g. electric light bulb) to be treated, and caused to adhere thereto, after which the glass surface together with the powder adhering thereto is heated to a temperature at which the particles of the powdered glass frit or fuse to the glass article without flowing to form a continuous glaze-like layer, and without complete softening of the glass article being brought about. The fritted or fused on particles, which form minute prominences on the surface of the glass article under treatment, are then entirely or for the greater part removed again by treatment of this surface with a glass-dissolving agent, the duration of this treatment being so determined or regulated that after removal of the fritted on particles there remains a glass surface provided with minute light-diffusing depressions (scars).

The nature of the powdered glass to be used for the described purpose depends upon the nature of the glass article to be treated. The softening temperature of the glass powder must be lower than that of the glass article, but not so low that the particles of the powder fuse completely at the temperature at which the material of the glass article just begins to soften, that is to say at a temperature slightly below the softening temperature of the glass article. Thus for the glass powder it is generally advisable to select glass the softening point of which is approximately 40–70° C., and preferably 60° C., below the softening point of the glass of which the article to be treated is made. If the particles of a glass powder of this description are originally sharp-edged they assume a rounded shape, through softening or superficial fusing, when heated to the temperature required for fritting them on to the surface of the glass article.

It will be understood that in selecting the material of the powdered glass it is advisable to use material of as nearly as possible the same coefficient of expansion as that of the glass article, so as to avoid setting up internal strains that would be detrimental to the strength of the finished product. The chemical composition of the powdered glass and of the material of the glass article should not be completely left out of consideration either, so as to ensure that no undesirable chemical reactions occur during the heating or in the course of the subsequent dissolving out of the caked-on particles, although precautions in this direction need only be taken when glass of unusual composition is used.

The grain size of the glass powder used for the described purpose varies according to the desired nature of the surface of the final product. For it has been found that under otherwise the same conditions the use of powder of larger grain size results in less densely scarred or pitted glass articles (glass bulbs), while on the other hand very small grains produce extremely fine pittings and therefore result in more finely frosted articles (bulbs). It is thus possible, by varying the grain size of the glass powder used, to influence the size of the pitting and with it the degree of light diffusion obtained, and this possibility constitutes a very considerable advantage of the method according to the invention. A limit is set however to the extent to which the grain size of the glass powder may be reduced, since, at the temperatures used, too fine a powder leads to the formation of a glaze-like layer or coating instead of distinct excrescences, in which case the final result is a relatively non-pitted and practically non-frosted glass surface. It is incidentally not difficult to select the right grain size provided care be taken to ensure that the powder is of the fineness of glass meal, so that the average grain size is of the order of one or more hundredths of a millimetre. If a grain size of 0.02 mm. be taken as average it is possible in any particular instance, by means of a few comparative tests with coarser and finer powders, using the same kind of glass, to discover what is the best grain size to use for the purpose in view. With the aid of a few preliminary tests it is also possible to determine the best softening or melting temperature of the glass powder for the present method in particular cases.

Regarding the three process steps the combination of which constitutes the method according to the invention, there is the following still to be said.

The first of these process steps, which consists in strewing or applying the glass powder in an adhesive form to the surface of glass articles, and more particularly to the inner or outer surface of glass bulbs, is in itself a known procedure, which may be carried out with the aid of known special apparatus. According to the usual method, the glass powder is applied to the glass surface in a moist state, that is to say a suspension of the powder in a readily vaporizing liquid is prepared and sprayed on to the glass surface to be treated; in this manner instantaneous adhesion and uniform distribution of the particles may be achieved. The moisture is eliminated, after application, by drying in the air or by gentle heat treatment.

The second process step, that is to say the heating, which brings about the fritting or fusing of the glass powder to the surface of the glass to be treated, may be carried out in a suitable oven, for example in an oven of the type used for baking on enamel. The temperature limits to be observed at this stage have already been discussed above. It is of advantage so to regulate the heating process that the surface of the glass article (bulb) just begins to soften when the particles of the applied glass powder have already become softened or even superficially fused without however becoming completely molten so as to be capable of coalescing.

The dissolving out of the melted on or fritted on particles of glass, which constitutes the third process step, may be effected by exposing the surface of the glass article for a sufficiently long time to the action of hydrofluoric acid. The right length of time for this treatment may be ascertained by a preliminary test or by examining the appearance and checking up the light-diffusing power of the surface of the glass article (bulb) at short intervals during the dissolving out process, since on the surface treated there gradually become formed a large number of minute depressions (pittings) which, however, disappear again if the action of the solvent be too protracted. For the practical application of the invention it is sufficient to know, as a matter of experience, that the formation of light-diffusing pittings during the described dissolving process is dependent upon the presence of the slight excrescences produced by the fritting or fusing on of glass powder and consequently on the carrying out of the second of the described three process steps. If this pre-condition be not fulfilled, or if a glass powder of unsuitable nature be employed, or if the powder coalesces to a glaze-like layer during the heating stage, no pittings are produced in the surface of the treated glass article during the subsequent treatment with hydrofluoric acid.

Although the duration of the dissolving process is not very critical, since some deviation in either direction from the optimum duration does not entirely spoil the desired frosting effect, yet it is desirable as a rule to dissolve out at least the same quantity of glass as has been applied in the form of powdered glass to the surface treated. If this quantity be exceeded no disadvantage is incurred as long as the pittings are not done away with. Shortening the duration of the dissolving process, and consequent cheapening of the manufacturing process, may be achieved by using particularly readily soluble kinds of glass.

After the third of the process steps, the glass article may be cleansed in the usual manner, for instance with water or steam, and then, if desired, dried. The treatment is then concluded, and the product ready for use.

The method according to the invention is capable of wide application, and also enables colored clear glass to be converted into colored glass which diffuses light, it being merely necessary for this purpose to select the right kinds of powdered glass, taking into account any possible chemical reactions that might occur.

The invention is particularly applicable to the frosting of electric light bulbs, and that both for inside and outside frosting. The advantages of the new method are particularly noticeable in the production of electric light bulbs which are partially frosted inside or outside. For this purpose the glass powder applied to the inside or outside of the bulb is mechanically removed from the parts of the surface that are to remain clear, which may very easily be effected before the second step of the process (the heating step). It is thus not necessary, as in the known methods of frosting, to cover up with paraffin, wax, or the like, the parts of the surface to be left unaffected by the treatment.

Since, as shown, the partial frosting of glass surfaces offers no difficulties, the method according to the invention is eminently suitable for decorating or printing on electric light bulbs or other glass products.

What we claim is:

1. The process of frosting the surface of glass objects, more particularly electric light bulbs, covering and flashing glasses, lamp shades and the like, which comprises applying glass powder to the surface to be frosted to form thereon a pulverous layer the particles of which are capable of softening at a temperature lower than the softening point of said glass object, but incapable of becoming at a temperature materially below said softening point of the object so very liquid as to coalesce; then subjecting said surface of the object together with the powder applied thereto to a heat treatment at a temperature at which the particles of said powder frit to said surface and form a great number of minute prominences thereon; and thereafter treating said surface with a glass-dissolving agent so as to remove, at least for the greater part, the fritted on particles from said surface, the duration and intensity of the last-mentioned treatment being so chosen that after this treatment is terminated there remains a frosted glass surface provided with minute light-diffusing depressions.

2. The process of frosting the surface of glass objects which comprises applying glass powder to the surface to be frosted to form a pulverous layer thereon, the nature of said powder being characterized by its softening temperature being lower than the softening point of said glass object and by the temperature at which the particles of the powder flow and coalesce being higher than said softening point of the object; then fritting or fusing said particles to said surface of the glass object by subjecting the latter together with the powder applied thereto to a heat treatment, the duration of said heat treatment and the temperature at which it is carried out being so chosen that the particles fritted on by said treatment form minute prominences on said surface of the object without formation of a glaze-like layer and without a remanent deformation of said object due to a thorough softening thereof; and thereafter subjecting the said surface to the action of a glass-dissolving agent, the intensity and duration of said action being so chosen that the said fritted on particles, at least for the greater part, are removed from said surface and there remains, after said action is terminated, a frosted glass surface provided with minute light-diffusing depressions.

3. The process of frosting the surface of glass objects, more particularly electric light bulbs, covering and flashing glasses, lamp shades and the like, which comprises preparing glass powder from a glass the softening point of which is lower than the softening point of said glass object; applying said powder to the surface to be frosted to form a pulverous layer thereon; subjecting said surface together with the powder applied thereto to a heat treatment adapted to effect fritting of the particles of said powder to said surface and thereby formation of minute prominences thereon; and thereafter subjecting said surface to the action of a glass-dissolving agent so as to remove at least for the greater part the said fritted on particles from said surface, the duration and intensity of said action being so chosen that after the latter is terminated, there remains a frosted glass surface provided with minute light-diffusing depressions.

4. The process as claimed in claim 3, wherein the said glass powder is prepared from a glass the softening temperature of which is substantially 40°–70° C. below the softening point of the glass of which the object to be frosted is made.

5. The process as claimed in claim 3, wherein the said glass powder is prepared from a glass the softening temperature of which is substantially 60° C. below the softening point of the glass of which the object to be frosted is made.

6. The process as claimed in claim 3, wherein the said glass powder is prepared from a glass the coefficient of expansion of which is so little different from that of the glass of the object to be frosted as to avoid setting up internal strains that would be detrimental to the strength of the frosted object.

7. The process as claimed in claim 2, characterized by the said heat treatment being so carried out that the said surface of the glass object just begins to soften when the said particles of the applied glass powder have already become softened without being completely molten.

8. The process as claimed in claim 2, characterized by the said heat treatment being so carried out that the said surface of the glass object just begins to soften when the said particles of the applied glass powder have already become superficially fused without however being completely molten so as to be capable of coalescing.

9. The process as claimed in claim 2 wherein the intensity and duration of the said action of the glass-dissolving agent upon the said surface is so chosen that at least the same quantity of glass is dissolved out as has before been applied in the form of powdered glass to the surface treated.

10. The process as claimed in claim 1, characterized by the feature that hydrofluoric acid is used as glass-dissolving agent for the said removing of the fritted on particles.

11. The process as claimed in claim 2, characterized by the feature that hydrofluoric acid is used as glass-dissolving agent for the said removing of the fritted on particles.

12. The process as claimed in claim 3, characterized by the feature that hydrofluoric acid is used as glass-dissolving agent for the said removing of the fritted on particles.

13. The process of partially frosting the surface of glass objects, more particularly electric light bulbs, covering and flashing glasses, lamp shades and the like, which comprises applying glass powder to the surface to be frosted to form thereon a pulverous layer the particles of which are capable of softening at a temperature lower than the softening point of said glass object, but incapable of becoming at a temperature materially below said softening point of the object so liquid as to coalesce; then removing said powder from the parts of said surface that are to remain clear in the finished product; then subjecting said surface together with the remaining powder applied thereto to a heat treatment at a temperature at which the particles of said powder frit to said surface and form a great number of minute prominences thereon; and thereafter treating said surface with a glass-dissolving agent so as to remove, at least for the greater part, the fritted on particles from said surface, the duration and intensity of the last-mentioned treatment being so chosen that after this treatment is terminated there remains a partially frosted glass surface provided with minute light diffusing depressions on its frosted parts.

14. The process as claimed in claim 13, characterized by the feature that the powder is mechanically removed from the parts of surface that are to remain clear in the finished product.

15. The process of frosting the surface of glass objects, which comprises applying glass powder to the surface to be frosted, then fritting the particles of said powder to said surface by a suitable heat treatment, and thereafter subjecting said surface to the action of a glass-dissolving agent.

KARL DULDNER.
ROMAN WADELKA.